United States Patent
Kanda

(10) Patent No.: US 8,848,595 B2
(45) Date of Patent: Sep. 30, 2014

(54) COMMUNICATION SYSTEM, DEPENDENT STATION THEREOF AND DEPENDENT-STATION RELAY TRANSMISSION METHOD

(75) Inventor: Tetsuo Kanda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 249 days.

(21) Appl. No.: 12/999,720

(22) PCT Filed: Jul. 17, 2009

(86) PCT No.: PCT/JP2009/063299
§ 371 (c)(1),
(2), (4) Date: Dec. 17, 2010

(87) PCT Pub. No.: WO2010/024073
PCT Pub. Date: Mar. 4, 2010

(65) Prior Publication Data
US 2011/0096716 A1    Apr. 28, 2011

(30) Foreign Application Priority Data

Aug. 28, 2008  (JP) ................................ 2008-220501

(51) Int. Cl.
| | | |
|---|---|---|
| H04B 7/14 | (2006.01) | |
| H04L 1/18 | (2006.01) | |
| H04L 1/00 | (2006.01) | |
| H04H 20/08 | (2008.01) | |
| H04H 20/42 | (2008.01) | |
| H04W 40/00 | (2009.01) | |

(52) U.S. Cl.
CPC ............ *H04L 1/1829* (2013.01); *H04L 1/1809* (2013.01); *H04L 1/0079* (2013.01); *H04H 20/42* (2013.01); *H04H 20/08* (2013.01); *H04W 40/00* (2013.01); *H04L 1/0027* (2013.01); *H04L 1/0028* (2013.01)
USPC ....................................................... 370/315

(58) Field of Classification Search
USPC ......... 370/204, 270, 315, 346, 350, 376, 400, 370/401, 445, 458, 470; 455/422, 452, 509
See application file for complete search history.

(56) References Cited

U.S. PATENT DOCUMENTS

| | | | | |
|---|---|---|---|---|
| 5,539,687 A | | 7/1996 | Torisawa et al. ............... | 364/821 |
| 5,677,909 A | * | 10/1997 | Heide ........................... | 370/347 |
| 5,708,402 A | | 1/1998 | Hachisu et al. ............... | 333/133 |
| 5,760,525 A | | 6/1998 | Hachisu et al. ............... | 310/313 |
| 5,815,055 A | | 9/1998 | Eguchi et al. ................. | 333/193 |

(Continued)

FOREIGN PATENT DOCUMENTS

| | | |
|---|---|---|
| JP | 61-210745 A | 9/1986 |
| JP | 8-163128 A | 6/1996 |

(Continued)

*Primary Examiner* — Chirag Shah
*Assistant Examiner* — Jael Ulysse
(74) *Attorney, Agent, or Firm* — Fitzpatrick, Cella, Harper & Scinto

(57) ABSTRACT

In a communication system that includes a control station and dependent stations, the control station broadcasts data intended for the dependent stations on a per-superframe basis. The dependent stations relay the data received from the control station among themselves. If a dependent station has received the data transmitted from the control station, the dependent station transmits an acknowledgement response. If a dependent station does not receive an acknowledgement response from another dependent station, then the dependent station relays the data intended for the other dependent station.

24 Claims, 17 Drawing Sheets

(56) References Cited

U.S. PATENT DOCUMENTS

| | | | |
|---|---|---|---|
| 5,917,850 A | 6/1999 | Fujita et al. | 375/200 |
| 5,936,997 A | 8/1999 | Kanda | 375/200 |
| 6,020,672 A | 2/2000 | Yokota et al. | 310/313 |
| 6,298,405 B1 | 10/2001 | Ito et al. | 710/107 |
| 6,542,494 B1 * | 4/2003 | Sugaya et al. | 370/345 |
| 6,625,162 B2 | 9/2003 | Myojo et al. | 370/445 |
| 6,693,891 B1 * | 2/2004 | Sugita et al. | 370/345 |
| 7,095,732 B1 * | 8/2006 | Watson, Jr. | 370/346 |
| 7,376,137 B2 * | 5/2008 | Sung et al. | 370/401 |
| 7,796,637 B2 * | 9/2010 | Doi et al. | 370/445 |
| 8,155,047 B2 | 4/2012 | Eguchi | |
| 2002/0051425 A1 | 5/2002 | Larsson | 370/252 |
| 2002/0151300 A1 * | 10/2002 | Suda et al. | 455/422 |
| 2003/0063619 A1 * | 4/2003 | Montano et al. | 370/443 |
| 2003/0133422 A1 | 7/2003 | Bims | 370/328 |
| 2003/0134590 A1 * | 7/2003 | Suda et al. | 455/3.06 |
| 2004/0032847 A1 * | 2/2004 | Cain | 370/338 |
| 2004/0131025 A1 * | 7/2004 | Dohler et al. | 370/328 |
| 2004/0174844 A1 | 9/2004 | Cho et al. | 370/328 |
| 2004/0214571 A1 * | 10/2004 | Hong | 455/435.1 |
| 2004/0235489 A1 * | 11/2004 | Kwon | 455/452.2 |
| 2005/0002373 A1 * | 1/2005 | Watanabe et al. | 370/346 |
| 2006/0013177 A1 * | 1/2006 | Saito | 370/338 |
| 2006/0028553 A1 | 2/2006 | Mori et al. | 348/207.99 |
| 2006/0050742 A1 * | 3/2006 | Grandhi et al. | 370/506 |
| 2006/0245440 A1 * | 11/2006 | Mizukoshi | 370/400 |
| 2006/0256741 A1 * | 11/2006 | Nozaki | 370/278 |
| 2006/0291410 A1 | 12/2006 | Herrmann | 370/328 |
| 2007/0060158 A1 | 3/2007 | Medepalli et al. | 455/450 |
| 2007/0127412 A1 | 6/2007 | Dent | 370/329 |
| 2007/0149118 A1 * | 6/2007 | Kang et al. | 455/11.1 |
| 2007/0240191 A1 | 10/2007 | Singh et al. | 725/81 |
| 2007/0274272 A1 * | 11/2007 | Joshi et al. | 370/338 |
| 2007/0280157 A1 * | 12/2007 | Kwon et al. | 370/329 |
| 2008/0069041 A1 * | 3/2008 | Tandai et al. | 370/329 |
| 2008/0117857 A1 | 5/2008 | Myojo | 370/315 |
| 2008/0130770 A1 * | 6/2008 | Khandekar et al. | 375/260 |
| 2008/0137585 A1 * | 6/2008 | Loyola et al. | 370/315 |
| 2008/0222478 A1 | 9/2008 | Tamaki | 714/749 |
| 2008/0232345 A1 * | 9/2008 | Espina et al. | 370/350 |
| 2008/0253354 A1 | 10/2008 | Eguchi | 370/350 |
| 2008/0304459 A1 | 12/2008 | Eguchi | 370/338 |
| 2009/0036151 A1 * | 2/2009 | Kanda | 455/501 |
| 2009/0052429 A1 * | 2/2009 | Pratt et al. | 370/350 |
| 2009/0245275 A1 | 10/2009 | Eguchi | 370/458 |
| 2009/0248829 A1 * | 10/2009 | Habetha et al. | 709/208 |
| 2009/0252140 A1 * | 10/2009 | Imaeda | 370/342 |
| 2010/0304772 A1 * | 12/2010 | Wang et al. | 455/509 |
| 2013/0010891 A1 * | 1/2013 | Au et al. | 375/295 |

FOREIGN PATENT DOCUMENTS

| | | |
|---|---|---|
| JP | 11-252114 A | 9/1999 |
| JP | 11-289335 | 10/1999 |
| JP | 2007-502564 A | 2/2007 |
| JP | 2007-266876 A | 10/2007 |
| WO | WO 01/61928 A2 | 8/2001 |
| WO | WO 2006/020520 A2 | 2/2006 |

* cited by examiner

F I G. 5
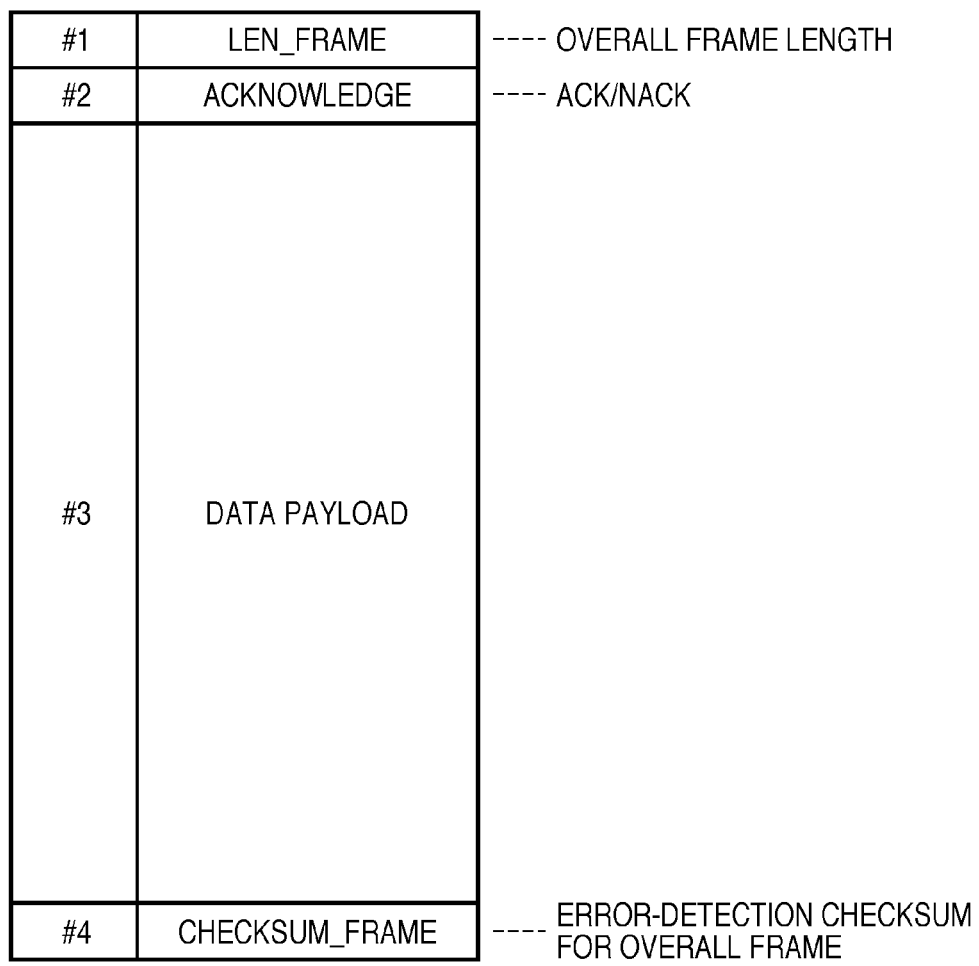

FIG. 6

| #1 | LEN_FRAME | ---- OVERALL FRAME LENGTH |
|---|---|---|
| #2 | ACKNOWLEDGE | ---- ACK/NACK |
| #3 | DATA_TYPE(ISO2) | ---- ISO1/ISO2/ISO3/ISO4/ASYNC |
| #4 | ISO_DATA(ISO2) | ---- ISOCHRONOUS DATA INTENDED FOR SECOND SLAVE STATION |
| #5 | DATA_TYPE(ISO3) | ---- ISO1/ISO2/ISO3/ISO4/ASYNC |
| #6 | ISO_DATA(ISO3) | ---- ISOCHRONOUS DATA INTENDED FOR THIRD SLAVE STATION |
| #7 | CHECKSUM_FRAME | ---- ERROR-DETECTION CHECKSUM FOR OVERALL FRAME |

FIG. 7

| #1 | LEN_FRAME | ---- OVERALL FRAME LENGTH |
|---|---|---|
| #2 | ACKNOWLEDGE | ---- ACK/NACK |
| #3 | CHECKSUM_FRAME | ---- ERROR-DETECTION CHECKSUM FOR OVERALL FRAME |

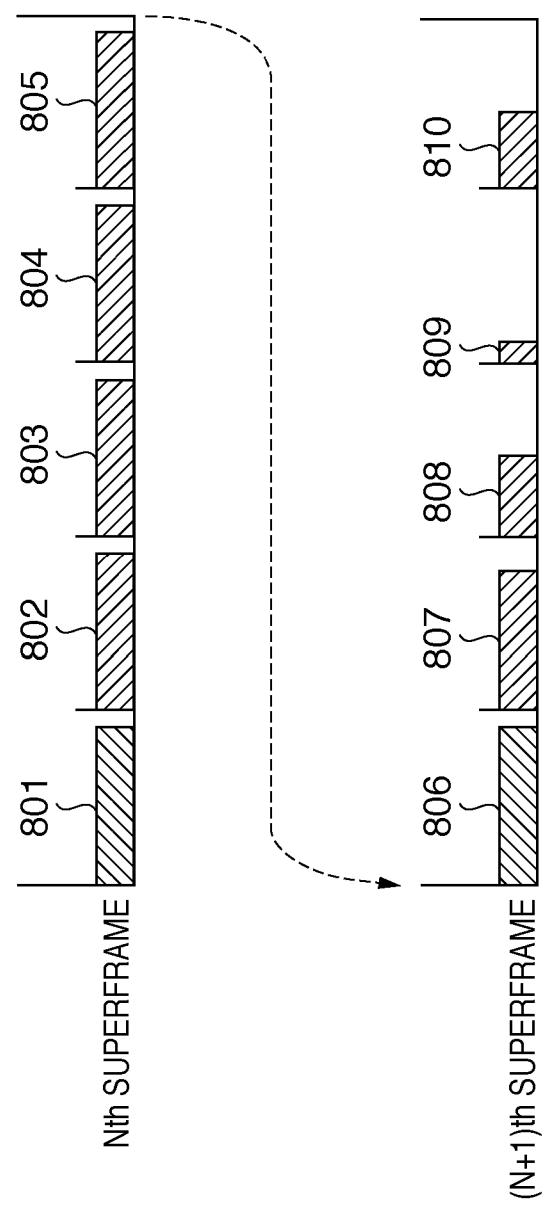

F I G. 9

| #1 | LEN_FRAME | ---- OVERALL FRAME LENGTH |
|---|---|---|
| #2 | ACKNOWLEDGE | ---- ACK/NACK |
| #3 | DATA_TYPE(ISO2) | ---- ISO1/ISO2/ISO3/ISO4/ASYNC |
| #4 | ISO_DATA(ISO2) | ---- ISOCHRONOUS DATA INTENDED FOR SECOND SLAVE STATION |
| #5 | DATA_TYPE(ISO3) | ---- ISO1/ISO2/ISO3/ISO4/ASYNC |
| #6 | ISO_DATA(ISO3) | ---- ISOCHRONOUS DATA INTENDED FOR THIRD SLAVE STATION |
| #7 | DATA_TYPE(ASYNC) | ---- ISO1/ISO2/ISO3/ISO4/ASYNC |
| #8 | LEN_ASYNC | ---- LENGTH OF ASYNCHRONOUS DATA |
| #9 | ASYNC_DATA | ---- ASYNCHRONOUS DATA |
| #10 | CHECKSUM_FRAME | ---- ERROR-DETECTION CHECKSUM FOR OVERALL FRAME |

FIG. 10

| #1 | LEN_FRAME | ---- OVERALL FRAME LENGTH |
|---|---|---|
| #2 | ACKNOWLEDGE | ---- ACK/NACK |
| #3 | DATA_TYPE(ASYNC) | ---- ISO1/ISO2/ISO3/ISO4/ASYNC |
| #4 | LEN_ASYNC | ---- LENGTH OF ASYNCHRONOUS DATA |
| #5 | ASYNC_DATA | ---- ASYNCHRONOUS DATA |
| #6 | CHECKSUM_FRAME | ---- ERROR-DETECTION CHECKSUM FOR OVERALL FRAME |

| #1 | LEN_FRAME | ---- OVERALL FRAME LENGTH |
|---|---|---|
| #2 | ASYNC_DATA | ---- ASYNCHRONOUS DATA |
| #3 | CHECKSUM_FRAME | ---- ERROR-DETECTION CHECKSUM FOR OVERALL FRAME |

FIG. 14

| #1 | ISO_DATA1 |
|---|---|
| #2 | CHECKSUM_ISO1 |
| #3 | ISO_DATA2 |
| #4 | CHECKSUM_ISO2 |
| #5 | ISO_DATA3 |
| #6 | CHECKSUM_ISO3 |
| #7 | ISO_DATA4 |
| #8 | CHECKSUM_ISO4 |

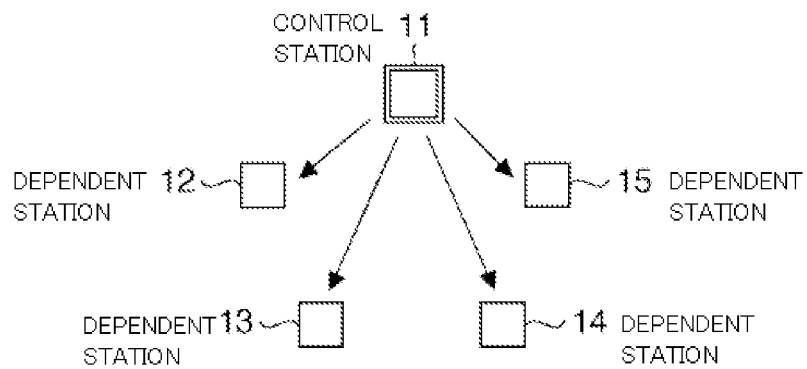
FIG. 20A
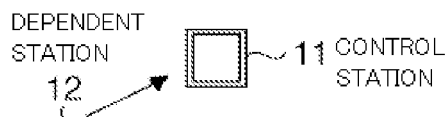
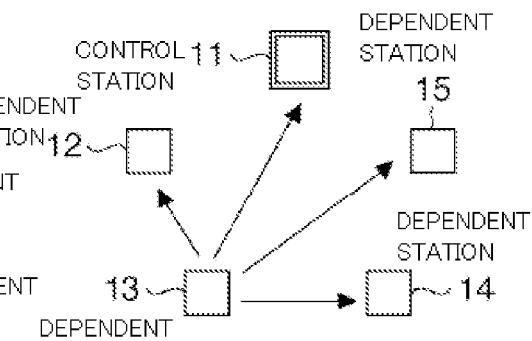
FIG. 20B          FIG. 20C
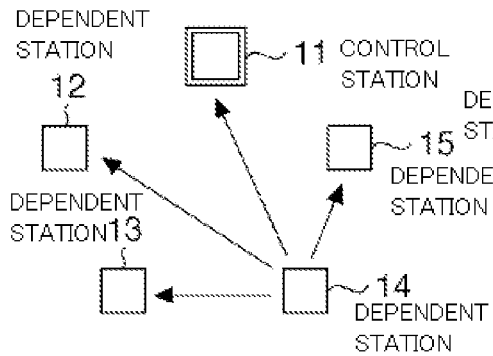 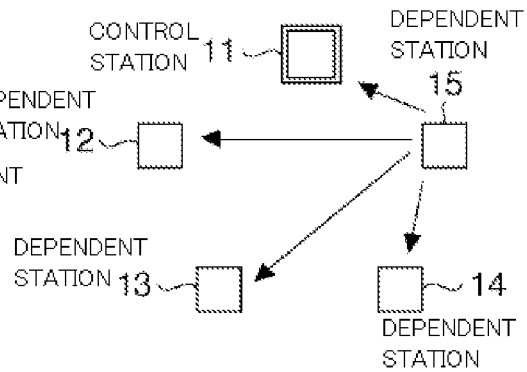
FIG. 20D          FIG. 20E

US 8,848,595 B2

COMMUNICATION SYSTEM, DEPENDENT STATION THEREOF AND DEPENDENT-STATION RELAY TRANSMISSION METHOD

TECHNICAL FIELD

The present invention relates to a technique whereby a control station broadcasts data, which is intended for multiple dependent stations, on a per-superframe basis.

BACKGROUND ART

Wireless communication systems are utilized as network systems that excel in mobility and have proliferated at a rapid pace due to improvements in transmission speed over wireless communication zones, the spread of mobile terminals and the appearance of applications suited to mobile communication. In particular, WLAN systems using radio waves in the 2.4-GHz or 5-GHz band have come into widespread use as schemes for wirelessly connecting computer equipment over comparatively short distances indoors or on-premises. Technical specifications for such schemes have been defined, for example, by the IEEE 802.11 family of standards.

Further, there is growing demand for machine-to-machine wireless communication for connecting not only computer peripherals but also printers and mobile telephones to consumer equipment such as digital still cameras and digital video cameras. At present, such equipment is generally connected by wire cables such as those for use with USB or IEEE-1394, but wireless connection methods are also under consideration as methods by which users can connect these devices in simple fashion.

Unlike WLAN, machine-to-machine wireless communication over very short distances aims to provide a wireless connection within a single person's surrounding environment, considered to be ten meters at most. Such a scheme is referred to as "WPAN" to distinguish it from WLAN. In relation to WPAN, physical and MAC layer specifications have been defined in the ECMA-368 standard by ECMA International, an organization that creates standards, with use being made of UWB (Ultra-Wideband) communication. A wireless USB standard has also been defined as a protocol that operates under ECMA-368.

In order to prevent so-called "frame collision", which is a state in which multiple wireless terminals transmit wireless frames simultaneously in a WLAN or WPAN system, the timing at which each wireless terminal accesses the wireless media is controlled. What determines the method of control is the MAC (Media Access Control) protocol. Although various schemes exist for the MAC protocol, they typically can be classified into two schemes, namely asynchronous data transfer and synchronous data transfer.

Generally, in asynchronous data transfer, a terminal that has acquired the right to access the media performs data transmission in accordance with the CSMA/CA (Carrier Sense Multiple Access/Collision Avoidance) protocol. If the terminal at the destination of this data receives the data correctly, the terminal generally sends back to the transmitting terminal an acknowledgement response referred to as an "acknowledge frame". If the data transmitting terminal receives the acknowledgement response, it determines that the data transfer is completed. Conversely, if the transmitting terminal does not receive the acknowledgement response, it determines that data transfer failed and attempts to re-transmit its data upon elapse of a fixed period of time.

Thus, in asynchronous data transfer, it is possible to transfer data to a destination terminal reliably. However, the amount of delay involved in the data transfer varies depending upon failure to acquire media-access privileges or re-transmission of data. Such variation in the amount of data involved in data transfer is referred to as "delay jitter".

It should be noted that since an application that transfers voice or a moving image requires synchronism or isochronism for a data transfer, asynchronous data transfer, which cannot easily provide such latency bounds on delay jitter, is not suitable for such an application.

With synchronous data transfer, on the other hand, each terminal performs the data transmission in a time slot allocated to the terminal as by a TDMA (Time Division Multiple Access) protocol. With such a protocol, each terminal is capable of acquiring the data transmission privilege at fixed periods and the delay jitter imposed upon the data transfer is small as a result. Accordingly, synchronous data transfer is well-suited for real-time data transmission having minimum delay requirements.

Further, with synchronous data transfer, it is required that delay jitter in a data transfer be kept within fixed limits. As a consequence, no acknowledgement response is exchanged between sending and receiving terminals and re-transmission processing is not executed when data fails. This means that with synchronous data transfer, there may be instances where data packets are lost, depending upon the state of communication.

However, in the transmission of voice or moving images, a characteristic of such communication is that the highest priority is always given to the maintenance of an average transmission speed and average delay. The application protocol therefore is designed so as to allow packet loss to some extent.

Thus, whereas synchronous data transfer is suitable for applications using that require delay bounds, as in the case of voice and moving images, application data can vanish due to packet loss. Such data loss is a drawback in that it can cause reproduced voice to be interrupted and degrade application quality.

In order to solve these problems encountered in synchronous data transfer, a repeater system in which identical data is transferred redundantly multiple times has been considered as a highly reliable communication system for suppressing the occurrence of data loss while maintaining synchronism. Such a repeater system will now be described.

FIG. 16 is a diagram illustrating an example of the configuration of a repeater system. This system comprises a control station 11 serving as a source that generates synchronous data such as voice or moving images, and four dependent stations 12 to 15 that are the destinations of synchronous data.

FIG. 17 is a diagram illustrating media access timing of the repeater system. This system employs TDMA as the access protocol, and the media access timing is managed in units of a fixed time period referred to as a superframe 21. The superframe 21 has been divided into time slots 31 to 35 in which the control station 11 and dependent stations 12 to 15, respectively, transmit data. In superframe 21, time slot 31 is the time over which the control station 11 transmits data, and the time slots 32 to 35 are the times over which the dependent stations 12 to 15, respectively, transmit data successively.

FIG. 18 is a diagram illustrating a wireless frame transmitted in each time slot of the superframe. Initially, the control station 11 broadcasts a broadcast frame 41 to all dependent stations in time slot 31 of the superframe. The broadcast frame 41 holds synchronous data intended for each of the dependent stations.

FIG. 19 is a diagram illustrating the frame format of the broadcast frame transmitted by broadcast. The broadcast frame 41 includes a field 51 in which an ISO_DATA1 field is placed. The field 51 contains the body of the synchronous data intended for dependent station 12. Similarly, fields 52 to 54 contain synchronous data intended for dependent stations 13 to 15, respectively. A CHECKSUM_FRAME field is placed in a field 55. By examining the checksum, the station that has received the broadcast frame 41 detects any bit error that has occurred in the broadcast frame 41. It should be noted that each item of synchronous data is assumed to be of fixed length in this example.

FIGS. 20A to 20E are diagrams illustrating directions of data transfer in each of the time slots. FIG. 20A illustrates the manner in which the broadcast frame 41 is transmitted from the control station 11 to each of the dependent stations 12 to 15 in the first time slot 31. Upon receiving the broadcast frame 41, each of the dependent stations 12 to 15 decides its own transmit timing by referring to a predetermined transmission sequence using the moment in time at which the broadcast frame 41 is received as a reference. From within the synchronous data contained in the broadcast frame 41 received, each of the dependent stations 12 to 15 utilizes the data intended for itself as application data. At the same time, the dependent stations 12 to 15 store the entirety of the broadcast frame 41 internally in order to relay it to another dependent station.

Upon receiving the broadcast frame 41 and deciding its own transmit timing, the dependent station 12 transmits a relay frame 42 in time slot 32 as a duplicate of the broadcast frame 41 received from the control station 11. This is illustrated in FIG. 20B. The other dependent stations 13 to 15 receive and store the relay frame 42. Similarly, in time slot 33, the dependent station 13 transmits a relay frame 43 as a duplicate of the broadcast frame 41 and the other dependent stations 12, 14 and 15 receive this relay frame 43.

Thus, the broadcast frame 41 transmitted from the control station 11 in time slot 31 is relayed from the dependent stations 12 to 15 in the time slots 32 to 35, as illustrated in FIGS. 20B to 20E. Further, relay frames 42 to 45 that are relayed have a format identical with that of the broadcast frame 41. Accordingly, as far as each of the dependent stations is concerned, there is an opportunity to receive the same synchronous data a total of four times as the broadcast frame from the control station 11 and the relay frames from the other three dependent stations.

Data is thus transferred multiple times in this system. As a result, even if a dependent station cannot receive a broadcast frame from the control station correctly, it can acquire the synchronous data intended for its own station from the relay frame transmitted from another dependent station. With this system, therefore, even if an event such as an interruption in the communication path occurs, a data transmission is completed within one superframe. This makes it possible to maintain the synchronism of the data transfer.

It should be noted that a technique for transmitting broadcast data to a destination node reliably has been proposed in the specification of Japanese Patent Laid-Open No. 2007-266876.

In the repeater system described above, packet loss is suppressed and highly reliable synchronous data communication achieved by relayed transmission of the same data between dependent stations. However, when this method is considered from the standpoint of efficient utilization of the frequency band, it is apparent that the same data is transmitted repeatedly and redundantly five times. Another aspect of this method, therefore, is that the communication band is utilized wastefully.

By way of example, if a certain dependent station is capable of receiving the broadcast data from the control station correctly, then repeated transmission in subsequent time slots is unnecessary communication and the communication band is consumed wastefully. In such a redundant repeater system, the communication band is essentially occupied by repeated transfer of data and it is not possible to transfer a greater amount of data.

As a result, a problem with the prior art is that it is difficult to optimize utilization of the communication band and increase the amount of data transferred in the system overall.

DISCLOSURE OF INVENTION

The present invention provides a wireless repeater system in which communication-band utilization efficiency is improved and the overall amount of transferred data, inclusive of synchronous data and asynchronous data, is increased.

In accordance with an aspect of the present invention, there is provided a communication system in which a control station broadcasts data intended for a plurality of dependent stations, on a per-superframe basis, each of the plurality of dependent stations comprising:

a receiving unit that receives data broadcast from the control station in an Nth (where N is an integer) superframe;

a transmitting unit that transmits an acknowledgement response that indicates a reception condition of the data, in a time slot that has been allocated to the dependent station in the Nth superframe; and a relaying unit that relays, in accordance with an acknowledgement response transmitted from another dependent station, data intended for the other dependent station in a time slot that has been allocated to the dependent station in an (N+1)th superframe.

In accordance with another aspect of the present invention, there is provided a dependent station of a communication system in which a control station broadcasts data intended for a plurality of dependent stations, on a per-superframe basis, the dependent station comprising:

a receiving unit that receives data broadcast from the control station in an Nth (where N is an integer) superframe;

a transmitting unit that transmits an acknowledgement response that indicates a reception condition of the data, in a time slot that has been allocated to the dependent station in the Nth superframe; and a relaying unit that relays, in accordance with an acknowledgement response transmitted from another dependent station, data intended for the other dependent station in a time slot that has been allocated to the dependent station in an (N+1)th superframe.

In accordance with a further aspect of the present invention, there is provided a method of relay transmission by a dependent station in a communication system in which a control station broadcasts data intended for a plurality of dependent stations, on a per-superframe basis, the method comprising:

receiving data broadcast from the control station in an Nth (where N is an integer) superframe;

transmitting an acknowledgement response that indicates a reception condition of the data, in a time slot that has been allocated to the dependent station in the Nth superframe; and in accordance with an acknowledgement response transmitted from another dependent station, relaying data intended for the other dependent station in a time slot that has been allocated to the dependent station in an (N+1)th superframe.

Further features of the present invention will become apparent from the following description of exemplary embodiments with reference to the attached drawings.

BRIEF DESCRIPTION OF DRAWINGS

FIG. 5 is a diagram illustrating the structure of a relay frame in the first embodiment;

FIG. 6 is a diagram illustrating the frame format of a relay frame 407 transmitted by a dependent station 102 and a relay frame 410 transmitted by a dependent station 105;

FIG. 7 is a diagram illustrating the frame format of a relay frame 408 transmitted by a dependent station 103 and a relay frame 409 transmitted by a dependent station 104;

FIG. 8 is diagram illustrating superframes in a case where dependent stations 102 and 103 transmit asynchronous data as data other than synchronous data;

FIG. 9 is a diagram illustrating the frame format of a relay frame in which dependent station 102 transmits asynchronous data;

FIG. 10 is a diagram illustrating the frame format of a relay frame 808;

FIG. 14 is a diagram illustrating an example of the format of a broadcast frame transmitted by a dependent station;

FIGS. 20A to 20E are diagrams illustrating directions of data transfer in respective time slots.

BEST MODE FOR CARRYING OUT THE INVENTION

Preferred embodiments of the present invention will now be described in detail with reference to the drawings.

First Embodiment

Figure 1:
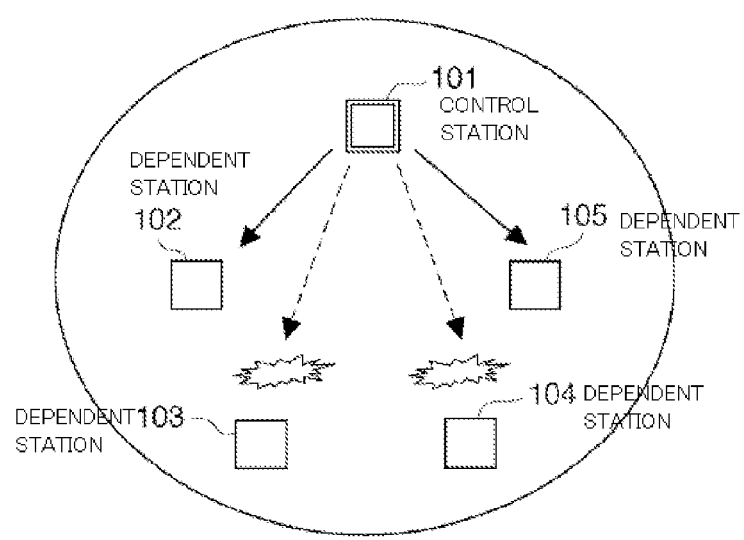
FIG. 1 is a diagram illustrating an example of the configuration of a wireless repeater system according to a first embodiment of the present invention.
Figure 17:
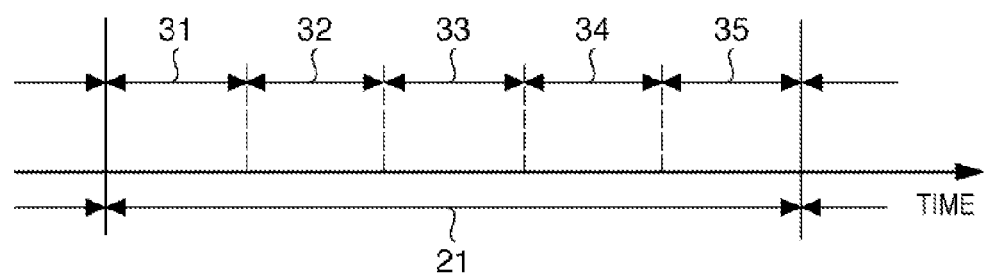
FIG. 17 is a diagram illustrating media access timing of the repeater system.

The configuration and operation of a wireless repeater system according to a first embodiment will be described with reference to FIGS. 1 to 7. FIG. 1 is a diagram illustrating an example of the configuration of a wireless repeater system according to a first embodiment of the present invention. As shown in FIG. 1, the wireless repeater system comprises a control station 101 serving as a source that generates synchronous data such as voice or moving images, and dependent stations 102 to 105 that are the destinations of the synchronous data. In this example also use is made of TDMA and the media access timing is managed in units of the superframe 21 shown in FIG. 17. The superframe 21 has been divided into a plurality of time slots 31 to 35 in which the control station 101 and dependent stations 102 to 105, respectively, transmit data.

Figure 2:
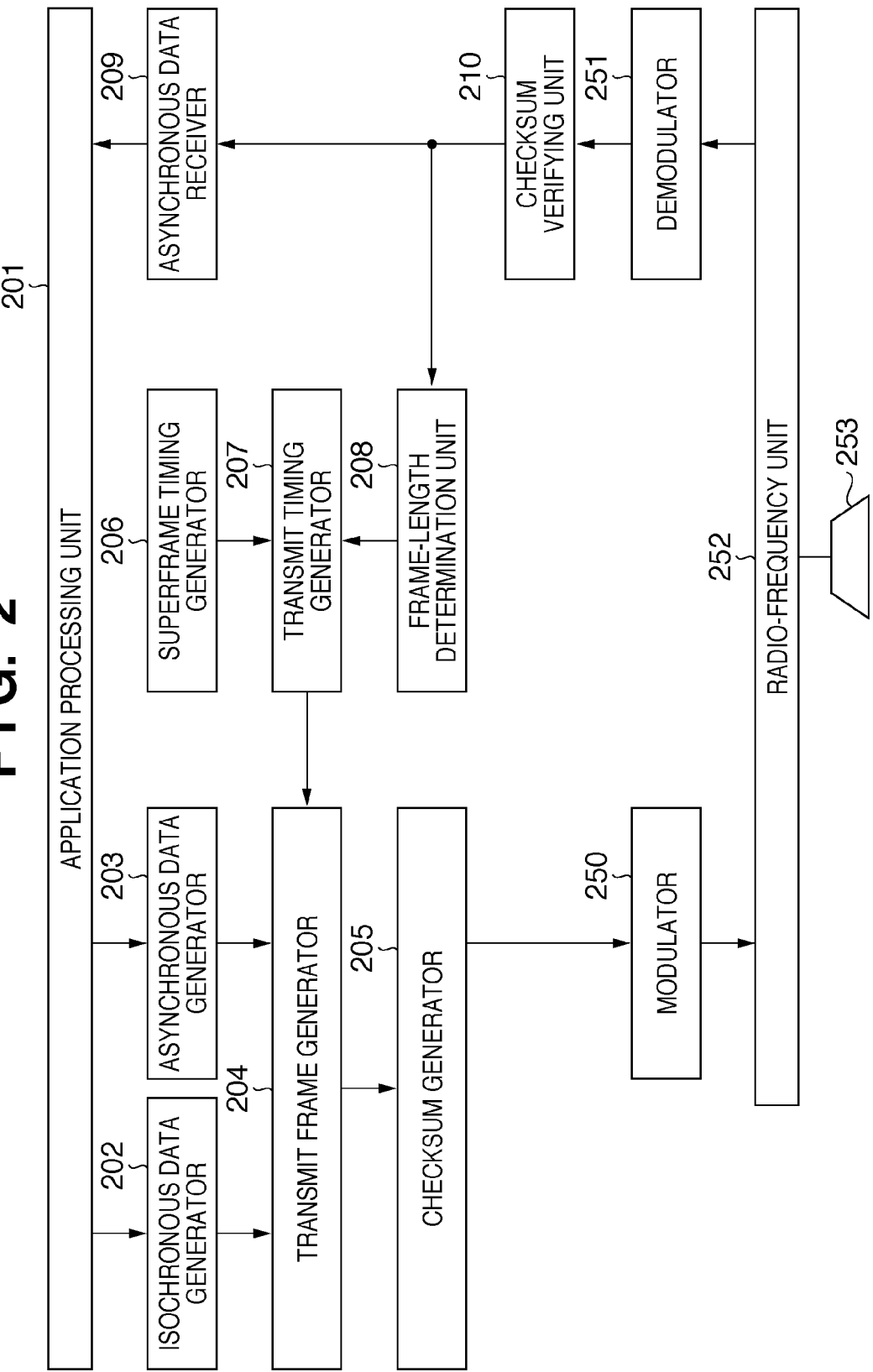
FIG. 2 is a diagram illustrating an example of the configuration of a control station in the first embodiment.

FIG. 2 is a diagram illustrating an example of the configuration of the control station in the first embodiment. A superframe timing generator 206 in FIG. 2 generates the timing of a superframe, as described later. Timing information generated by the superframe timing generator 206 is sent to a transmit timing generator 207. In accordance with a command from the transmit timing generator 207, a transmit frame generator 204 generates a transmit frame using synchronous data, which is intended for each dependent station, accepted from an application processing unit 201 via an synchronous data generator 202. The transmit frame generator 204 further generates a transmit frame in similar fashion also in a case where asynchronous data is accepted via an asynchronous data generator 203. The asynchronous data will be described later.

A checksum for error detection is appended to the generated transmit frame in a checksum generator 205, the transmit frame is converted to a wireless signal by a modulator 250 and radio-frequency unit 252, and the resultant signal is then sent to the wireless media from an antenna 253.

On the other hand, a relay frame from each dependent station is received at the antenna 253 and is input to a checksum verifying unit 210 via the radio-frequency unit 252 and a demodulator 251. The checksum is verified and then the relay frame is sent to a frame-length determination unit 208 or asynchronous data receiver 209.

Figure 3:
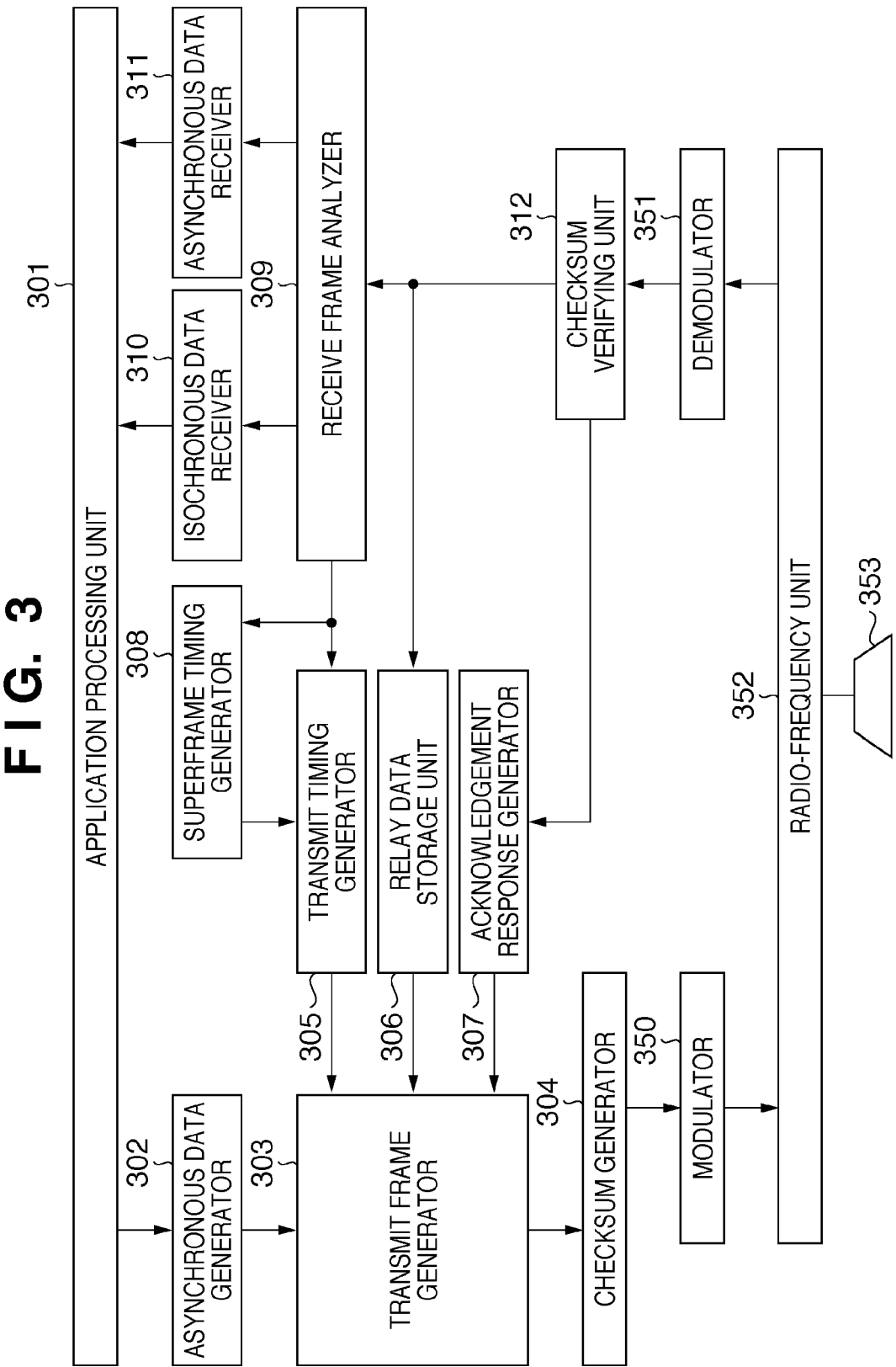
FIG. 3 is a diagram illustrating an example of the internal configuration of a dependent station in the first embodiment.

FIG. 3 is a diagram illustrating an example of the internal configuration of a dependent station in the first embodiment. In FIG. 3, an application processing unit 301, an asynchronous data generator 302, a transmit frame generator 303, a checksum generator 304, a transmit timing generator 305 and a superframe timing generator 308 are similar to those in the control station shown in FIG. 2. Further, a modulator 350, demodulator 351, radio-frequency unit 352 and antenna 353 have functions similar to those in the control station.

With reference to FIG. 3, a broadcast frame received by the antenna 353 is converted to receive data by the radio-frequency unit 352 and demodulator 351. The receive data is examined by checksum verifying unit 312 to determine whether it contains a bit error. If it is determined that the receive data does not contain a bit error, then the receive data is sent to a receive frame analyzer 309 and relay data storage unit 306. In order for all synchronous data that has been received correctly by each dependent station to be relayed to another dependent station, the synchronous data is stored temporarily in the relay data storage unit 306. The receive data is further sent to a synchronous data receiver 310 or an asynchronous data receiver 311 depending upon result of analysis by the receive frame analyzer 309.

In a case where the receive data is a broadcast frame from the control station 101, a synchronous control signal is sent from the receive frame analyzer 309 to the superframe timing generator 308. Thus, the dependent stations 102 to 105 are capable of synchronously tracking a superframe managed by the control station 101 and of transmitting relay frames in the time slots that have been assigned to them.

Further, upon receiving the broadcast frame, each of the dependent stations 102 to 105 decides its own transmit timing and transmits a relay frame by referring to a predetermined transmission sequence using the moment in time at which the broadcast frame is received as a reference.

Figure 4:
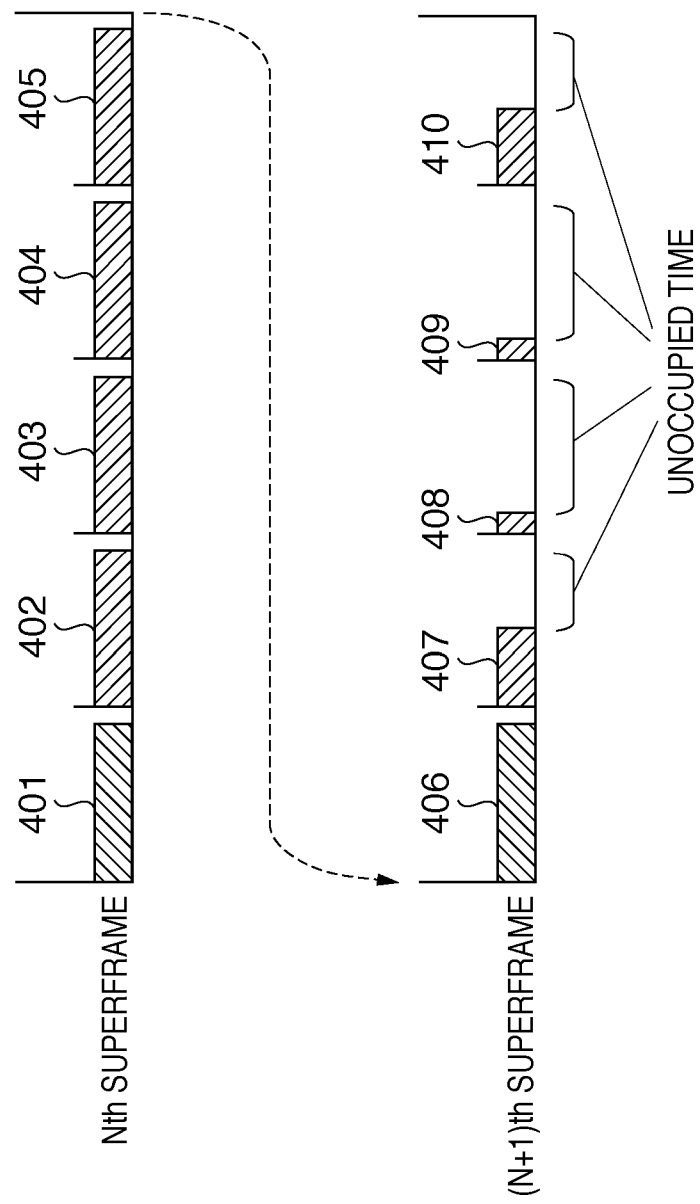
FIG. 4 is a diagram illustrating the structure of superframes in the first embodiment.

FIG. 4 is a diagram illustrating the structure of superframes in the first embodiment. In this example, an Nth superframe is illustrated above an (N+1)th superframe for the sake of convenience in terms of the drawing. However, the superframes are placed in such a manner that the Nth superframe will precede the (N+1)th superframe in terms of time.

Figure 19:
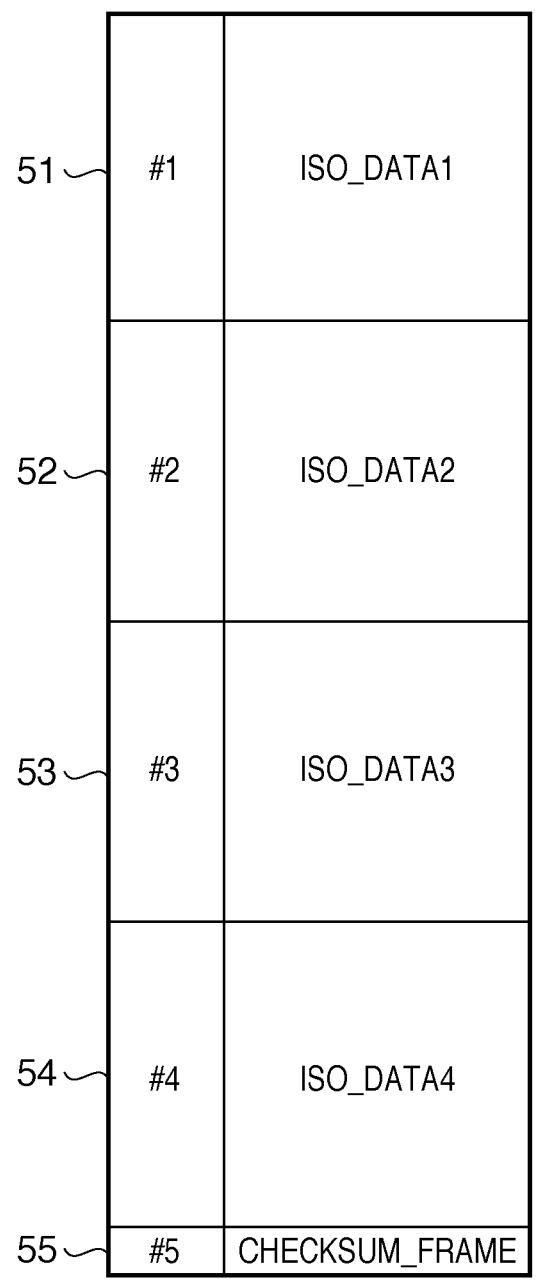
FIG. 19 is a diagram illustrating the frame format of a broadcast frame transmitted by broadcast.

First, in the initial time slot of the Nth superframe, the control station 101 broadcasts an Nth broadcast frame 401, which holds the synchronous data intended for the dependent stations, to all of the dependent stations. The frame format of the broadcast frame 401 is the same as that shown in FIG. 19.

Shown in FIG. 4 are a relay frame 402 transmitted by the dependent station 102, a relay frame 403 transmitted by the dependent station 103, a relay frame 404 transmitted by the dependent station 104 and a relay frame 405 transmitted by the dependent station 105.

Examples of frame formats of relay frames characterizing the present invention will be described with reference to FIGS. 5 to 7.

FIG. 5 is a diagram illustrating the structure of a relay frame in the first embodiment. Provided in the header of the relay frame are a LEN_FRAME field indicating the length of the overall frame, and an ACKNOWLEDGEMENT field indicating an acknowledgement response to the broadcast frame received by the same superframe. Depending upon the device packaging, a byte (eight bits) and a word (16 bits) can be mentioned as the unit of frame length indicated by the LEN_FRAME field. However, the present invention is applicable even if some other unit of length is adopted.

A station that has received these relay frames can ascertain the length of the relay frame by referring to the value of the LEN_FRAME field. At the same time, the station can calculate the length of the period of time over which the frame occupies the communication band.

Further, ACK, which indicates an acknowledgement response, and NACK, which indicates a negative-acknowledgement response, can be mentioned as examples of values stored in the ACKNOWLEDGEMENT field. In this example, a dependent station that has received the broadcast frame correctly sets ACK as the value in the ACKNOWLEDGEMENT field. On the other hand, a dependent station that has failed to receive the broadcast frame sets NACK as the value in the ACKNOWLEDGEMENT field.

A third field in the relay frame shown in FIG. 5 is a data payload. Synchronous data and other asynchronous data is stored in the data payload. Such data will be described in detail later.

A fourth and final field of the relay frame is a checksum for detecting whether the overall relay frame contains a bit error. Generally, a CRC (Cyclic Redundancy Code) or the like consisting of 16 bits, 32 bits, or the like, is utilized as the checksum. However, any code is applicable so long as bit error can be detected.

As illustrated in FIG. 1, consider a case where the broadcast frame 401 transmitted from the control station 101 could be received correctly by the dependent stations 102 and 105 but not by the dependent stations 103 and 104, where reception failed.

Each dependent station refers to the result of error detection by the checksum verifying unit 312 and decides the value set in the ACKNOWLEDGEMENT field using an acknowledgement response generator 307. The value ACK is stored in the ACKNOWLEDGEMENT field of the relay frame 402 of dependent station 102 and in the ACKNOWLEDGEMENT field of the relay frame 405 of dependent station 105 since these dependent stations received the Nth broadcast frame 401 correctly. The value NACK is stored in the ACKNOWLEDGEMENT field of the relay frame 403 of dependent station 103 and in the ACKNOWLEDGEMENT field of the relay frame 404 of dependent station 104 since these dependent stations failed to receive the Nth broadcast frame 401.

As a result, due to the fact that an acknowledgement response transmitted by each dependent station using the ACKNOWLEDGEMENT field is received by the other dependent stations, each dependent station is capable of determining whether transfer of synchronous data contained in the broadcast frame is necessary or not. For example, the dependent station 102 comprehends that it itself received the Nth broadcast frame 401 correctly, and further receives the ACKNOWLEDGEMENT field holding the value ACK transmitted by the dependent station 105 as the acknowledgement response.

Accordingly, the dependent station 102 determines that it will suffice if only the synchronous data intended for the dependent stations 103 and 104 in the Nth broadcast frame is relayed in the (N+1)th superframe. Further, the dependent station 105 determines that it itself received the Nth broadcast frame 401 correctly, and further receives the ACKNOWLEDGEMENT field holding the value ACK transmitted by the dependent station 102 as the acknowledgement response.

Accordingly, the dependent station 105 similarly judges that it will suffice if only the synchronous data intended for the dependent stations 103 and 104 in the Nth broadcast frame is relayed in the (N+1)th superframe.

Described next will be the operation of each station in the (N+1)th superframe in a case where the Nth broadcast frame 401 has failed to be received by the dependent stations 103 and 104. An (N+1)th broadcast frame 406 that holds the synchronous data intended for each of the dependent stations is also broadcast in the (N+1)th superframe by the control station 101 in the first time slot. Upon receiving the broadcast frame 406, the dependent stations 102 to 105 decide their own transmit timings and transmit their relay frames in the same manner as the Nth superframe.

Shown in FIG. 4 are a relay frame 407 transmitted by the dependent station 102, a relay frame 408 transmitted by the dependent station 103, a relay frame 409 transmitted by the dependent station 104 and a relay frame 410 transmitted by the dependent station 105.

FIG. 6 is a diagram illustrating the frame format of relay frame 407 transmitted by dependent station 102 and the frame format of relay frame 410 transmitted by dependent station 105. These relay frames also have a header that includes the LEN_FRAME field and ACKNOWLEDGEMENT field similar to the relay frame shown in FIG. 5.

First, the LEN_FRAME field indicates the length of the overall relay frame, and the ACKNOWLEDGEMENT field is the acknowledgement response indicating whether the broadcast frame in the same superframe was received correctly or not. The relay frame further has an synchronous data section in which synchronous data that is to be relayed has been stored.

In FIG. 6, a DATA_TYPE field is indicated as a third field. In order to indicate that this synchronous data is data intended for the dependent station 103, this field has been set to ISO2 as the value thereof. The relay frame has an ISO_DATA field as a fourth field. The body of the synchronous data intended for the dependent station 103 has been stored in this field.

Similarly, the relay frame has a DATA_TYPE field as a fifth field. In order to indicate that the ensuing synchronous data is data intended for the dependent station 104, this field has been set to ISO3 as the value thereof. The relay frame has an ISO_DATA field as a sixth field. The body of the synchronous data intended for the dependent station 104 has been stored in this field.

By transmitting relay data having this format, only the synchronous data intended for the dependent stations 103 and 104 is relayed from the dependent stations 102 and 105.

FIG. 7 is a diagram illustrating the frame format of the relay frame 408 transmitted by the dependent station 103 and the relay frame 409 transmitted by the dependent station 104. Since the dependent stations 103 and 104 have not correctly received the Nth broadcast frame 401 transmitted from the control station 101, synchronous data capable of being relayed to another dependent station is not held in the (N+1)th superframe.

Accordingly, the dependent stations 103 and 104 just transmit the acknowledgement response with respect to the (N+1)th broadcast frame 406 and do not relay synchronous data.

Figure 18:
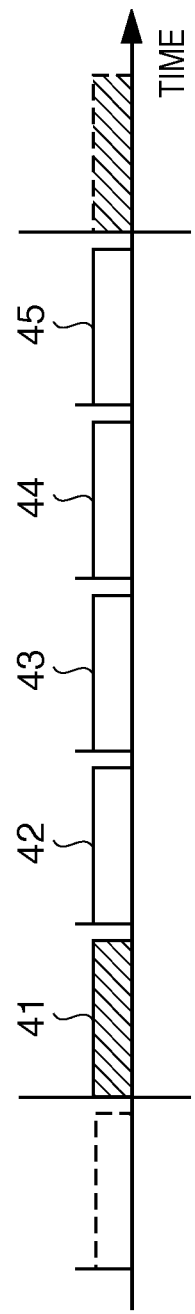
FIG. 18 is a diagram illustrating a wireless frame transmitted in each time slot of a superframe.

As described above, unnecessary relay transmission of synchronous data is suppressed by using the acknowledgement response. As illustrated in FIG. 4, therefore, the relay frames 407 to 410 to which the present invention has been applied have frame lengths shorter than the frame length of the relay frames 42 to 45 in the conventional repeater system already illustrated in FIG. 18.

As a result, as shown in FIG. 4, the time period reserved for the purpose of relay transmission (the latter-half portion of the time slot) is actually no longer used for relay transmission and hence an unoccupied time period can be provided in terms of the communication media. Further, since synchronous data transmitted from the control station to each dependent station in the Nth superframe can be received by each dependent station at least in the (N+1)th superframe, a communication system having little delay jitter and capable of utilizing the communication band efficiently can be constructed.

In the description rendered thus far, it is assumed that each dependent station does not possess other data requiring transmission, such as asynchronous data, and the formats shown in FIGS. 5 to 7 are utilized as the relay frames. From this point onward, a description will be provided for how unoccupied time thus obtained is utilized in order that each dependent station may transmit other data.

FIG. 8 is diagram illustrating superframes in a case where the dependent stations 102 and 103 transmit asynchronous data as data other than synchronous data. Asynchronous data is data other than data transmitted in synchronous fashion by relay transmission. It is possible to transmit data having various formats and characteristics as synchronous data.

In FIG. 8, reference numerals 801 to 806, 809 and 810 denote frames identical with the frames 401 to 406, 409 and 410, respectively, shown in FIG. 4. Indicated at 807 is a relay frame transmitted by the dependent station 102. FIG. 9 is a diagram illustrating the frame format of a relay frame in which the dependent station 102 transmits asynchronous data, In FIG. 9, first to sixth fields are the same as those shown in FIG. 6. Using these six fields, the dependent station 102 makes an acknowledgement response to the (N+1)th broadcast frame 806 and, at the same time, relays synchronous data contained in the Nth broadcast frame 801 to the dependent stations 103 and 104. In a case where the dependent station 102 possesses asynchronous data to be transmitted, seventh to ninth fields are added as fields for transmission of asynchronous data, as shown in the frame format of FIG. 9.

First, a DATA_TYPE field serving as the seventh field holds ASYNC as its value. Each station that has received the relay frame 807 can, by referring to this field, identify the fact that asynchronous data has been transmitted. Next, a LEN_ASYNC field serving as the eighth field indicates the data length of the asynchronous data. Unlike synchronous data, often the data length of asynchronous data is variable. Each station that has received the relay frame 807 can, by referring to this field, ascertain the data length of the asynchronous data. Finally, an ASYNC_DATA field serving as the ninth field is the field in which the asynchronous data is stored.

Here the manner in which a dependent station transmits asynchronous data using unoccupied time is described. No particular description of the details of the internal format of the ASYNC_DATA field will be provided. However, it is assumed that the content of the ASYNC_DATA field includes an address of a station that is the destination of the asynchronous data, and various tags, and the like, for identifying data type, in accordance with the communication protocol of the asynchronous data.

Further, it is possible for the ASYNC_DATA field to be divided into a plurality of subfields in order to transmit asynchronous data to a plurality of destination terminals. It goes without saying that the present invention is applicable regardless of what method of use is employed with regard to the content of the ASYNC_DATA field.

The operation of the dependent station 103 will be described next. The dependent station 103 transmits the relay frame 808 in the (N+1)th superframe, as illustrated in FIG. 8. The frame format of the relay frame 808 is illustrated in FIG. 10. The first and second fields in this frame format are identical with those shown in FIG. 7, and the dependent station 103 transmits an acknowledgement response with respect to the (N+1)th broadcast frame 806.

In a case where the dependent station 103 possesses asynchronous data to be transmitted, the third to fifth fields are added as fields for transmission of asynchronous data, as shown in FIG. 10. These fields correspond to the seventh to ninth fields in the relay frame 807 transmitted by the dependent station 102 shown in FIG. 9.

The dependent station 103 does not perform a relay transmission in the (N+1)th superframe. However, by utilizing the third to fifth fields, the dependent station 103 can transmit asynchronous data utilizing the unoccupied time in a manner similar to that of the dependent station 102.

As described above, the communication band is provided with unoccupied time owing to transmission of an acknowledgement response by a dependent station, and the dependent station can transmit asynchronous data by utilizing this unoccupied time. As a result, it is possible to transfer asynchronous data anew and to increase the overall amount of transfer of data inclusive of both synchronous data and asynchronous data.

It should be noted that since synchronous data often is handled as fixed-length data, the invention has been described using fixed-length synchronous data. However, the present invention is applicable even to synchronous data of variable length. Furthermore, formats for carrying out transmission of the acknowledgement response, relay transmission of synchronous data and transmission of asynchronous data using a single frame have been exemplified. However, it is possible for these to be transmitted from dependent stations as separate frames.

Second Embodiment

A second embodiment according to the present invention will now be described in detail with reference to the drawings. In the first embodiment, it is described that dependent stations can transmit asynchronous data in the wireless repeater system to which the present invention is applied. In the second embodiment, a method in which the control station 101 transmits asynchronous data in a manner similar to that of the dependent stations 102 and 103 will be described.

The configuration of the wireless repeater system according to the second embodiment is similar to that of the first embodiment described with reference to FIG. 1 and need not be described again. Further, the internal configuration of the control station 101 and the internal configuration of the dependent stations 102 to 105 also are similar to those of the first embodiment described with reference to FIGS. 2 and 3 and need not be described again.

A case where the frames shown in FIG. 8 described in the first embodiment are transmitted will be described as an example of operation of the repeater system according to the second embodiment. As described in the first embodiment, the dependent stations 102 to 105 execute relay transmission and transmission of asynchronous data simultaneously by transmitting the relay frames 807 to 810 in the (N+1)th superframe.

In the (N+1)th superframe illustrated in FIG. 8, the dependent station 103 transmits the relay frame 808 but unoccupied time still remains from the end point of the relay frame 808 to the next time slot. In the second embodiment, an asynchronous frame holding asynchronous data is transmitted by the control station 101 in this unoccupied period of time.

The control station 101 receives the relay frames shown in FIG. 8. Since each of these relay frames includes the LEN_FRAME field, as mentioned earlier, the control station 101 can ascertain the length of this relay frame by using the frame-length determination unit 208 to refer to the value in the LEN_FRAME field. Furthermore, since the control station 101 controls the TDMA protocol, the starting time of each time slot is already known.

Accordingly, it is possible for the control station 101 to accurately detect unoccupied time in which the communication media are not being utilized from end time of relay data transmitted by each slot until the next time slot.

In FIG. 2, the transmit timing generator 207 obtains information relating to end time of a receive frame from the frame-length determination unit 208 and starting time of the next time slot from the superframe timing generator 206. On the basis of such information, the transmit timing generator 207 instructs the transmit frame generator 204 to perform frame transmission. Thus, by transmitting an asynchronous frame in an unoccupied time period, the control station 101 can transmit asynchronous data without causing frame collision with another dependent station.

Figure 11:
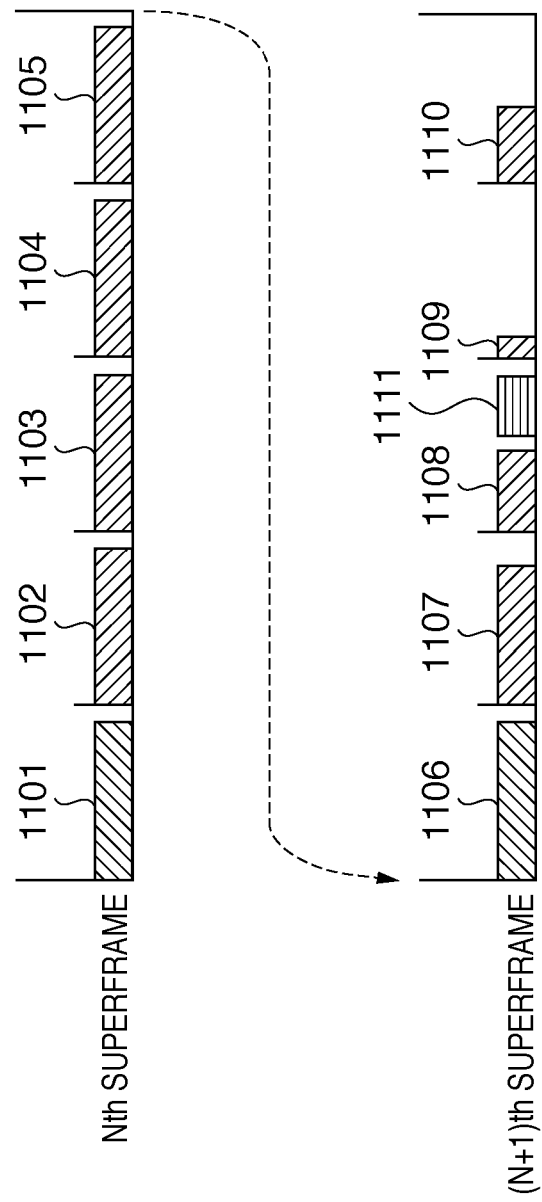
FIG. 11 is a diagram illustrating the structure of superframes in a case where a control station transmits an asynchronous frame.

FIG. 11 is a diagram illustrating the structure of superframes in a case where the control station transmits an asynchronous frame. Numerals 1101 to 1110 in FIG. 11 denote frames identical with those frames 801 to 810 shown in FIG. 8.

In the (N+1)th superframe, the control station 101 that has received the relay frame 1108 of dependent station 103 senses the end of the relay frame 1108 and immediately starts transmitting an asynchronous frame 1111.

Figures 12, 13:
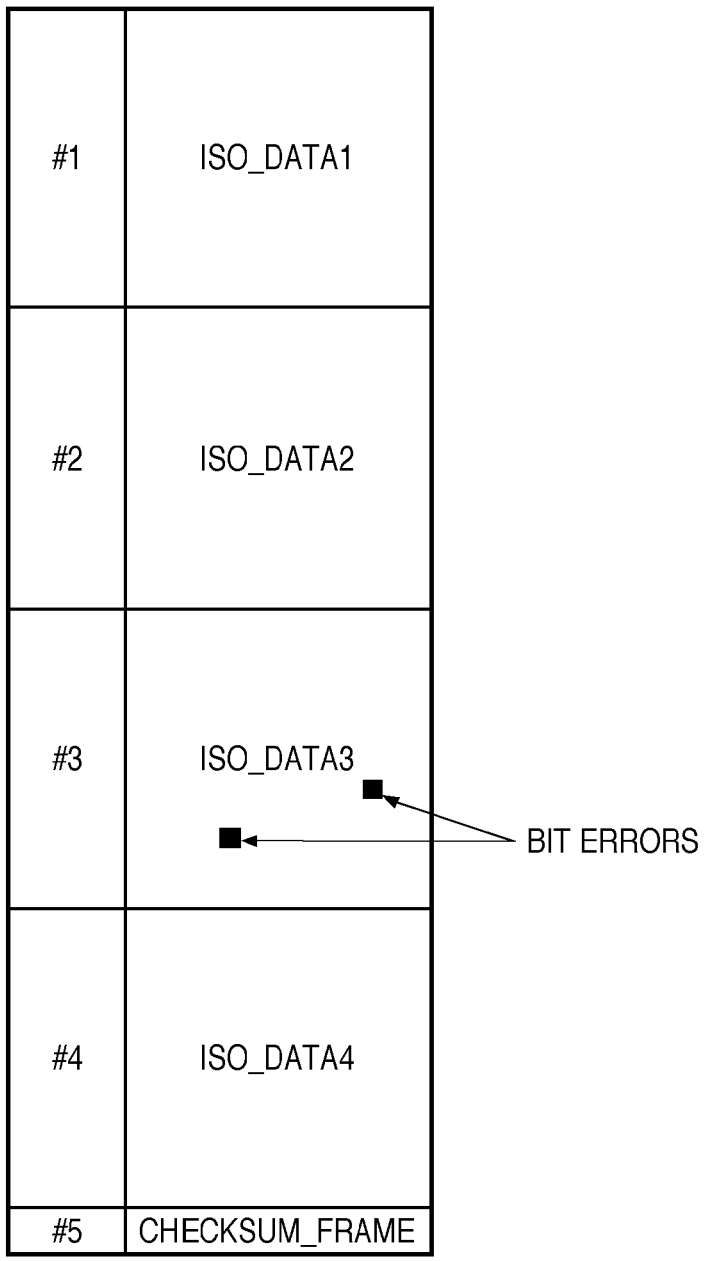
FIG. 12 is a diagram illustrating an example of the structure of an asynchronous frame transmitted by a control station.
FIG. 13 is a diagram useful in describing a problem that arises in a third embodiment.

FIG. 12 is a diagram illustrating an example of the structure of an asynchronous frame transmitted by the control station. The first field is a LEN_FRAME field indicating the overall length of the asynchronous frame 1111. Depending upon the device packaging, a byte (eight bits) and a word (16 bits) can be mentioned as the unit of frame length indicated by the LEN_FRAME field. However, the present invention is applicable even if some other unit of length is adopted.

The control station 101 decides the length of the asynchronous frame 1111 and sets the LEN_FRAME field in such a manner that the asynchronous frame 1111 will end before the moment at which the next time slot begins.

The second field shown in FIG. 12 is an ASYNC_DATA frame in which asynchronous data transmitted from the control station 101 is stored. In the second embodiment, it is described how the control station 101 transmits asynchronous data using unoccupied time. No particular description of the details of the internal format of the ASYNC_DATA field are provided. However, it goes without saying that it is possible to apply the present invention regardless of what method of use is employed with regard to the content of the ASYNC_DATA field.

As described above, in a case where the dependent stations 102 to 105 transmit asynchronous data utilizing unoccupied time, the control station 101 can also transmit asynchronous data in similar fashion. Applying the present invention makes it possible for the control station and dependent stations to transmit both synchronous data and asynchronous data.

Furthermore, the number of times relay transmission is required is optimized in accordance with the state of communication, and nearly all of the unoccupied time can be utilized to transmit asynchronous data. This makes it possible to increase the amount of data transferred in the overall system.

Third Embodiment

Next, a third embodiment according to the present invention will be described in detail with reference to the drawings. In the third embodiment, relay transmission is optimized.

The configuration of the wireless repeater system according to the third embodiment is similar to that of the first embodiment described with reference to FIG. 1 and need not be described again. Further, the internal configuration of the control station 101 and the internal configuration of the dependent stations 102 to 105 also are similar to those of the first embodiment described with reference to FIGS. 2 and 3 and need not be described again.

In the third embodiment as well, a case where the Nth broadcast frame 401 has failed to be received by the dependent stations 103 and 104 is assumed. As illustrated in FIG. 13, the occurrence of a bit error is possible only in an ISO_DATA3 field, which is synchronous data intended for the dependent station 104 contained in the third field of the received broadcast frame 401.

Even if the entire broadcast frame 401 cannot be received correctly, as long as the dependent station 103 can acquire its own synchronous data contained in an ISO_DATA2 field, a subsequent relay transmission from another dependent station will be unnecessary. Despite this fact, in the first embodiment under these conditions, the dependent stations 102 and 105 relay the synchronous data intended for the dependent station 103 and waste communication bandwidth by needless communication.

In view of these circumstances, the third embodiment uses the format shown in FIG. 14 as an example of the format of a broadcast frame transmitted by the control station 101. In FIG. 14, the synchronous data intended for the dependent stations has been stored in the respective fields ISO_DATA1 to ISO_DATA4. Furthermore, the fields CHECKSUM1 to CHECKSUM4 are provided immediately after the ISO_DATA1 to ISO_DATA4 fields, as checksums based upon an error-detection code for every item of synchronous data.

Figure 15:
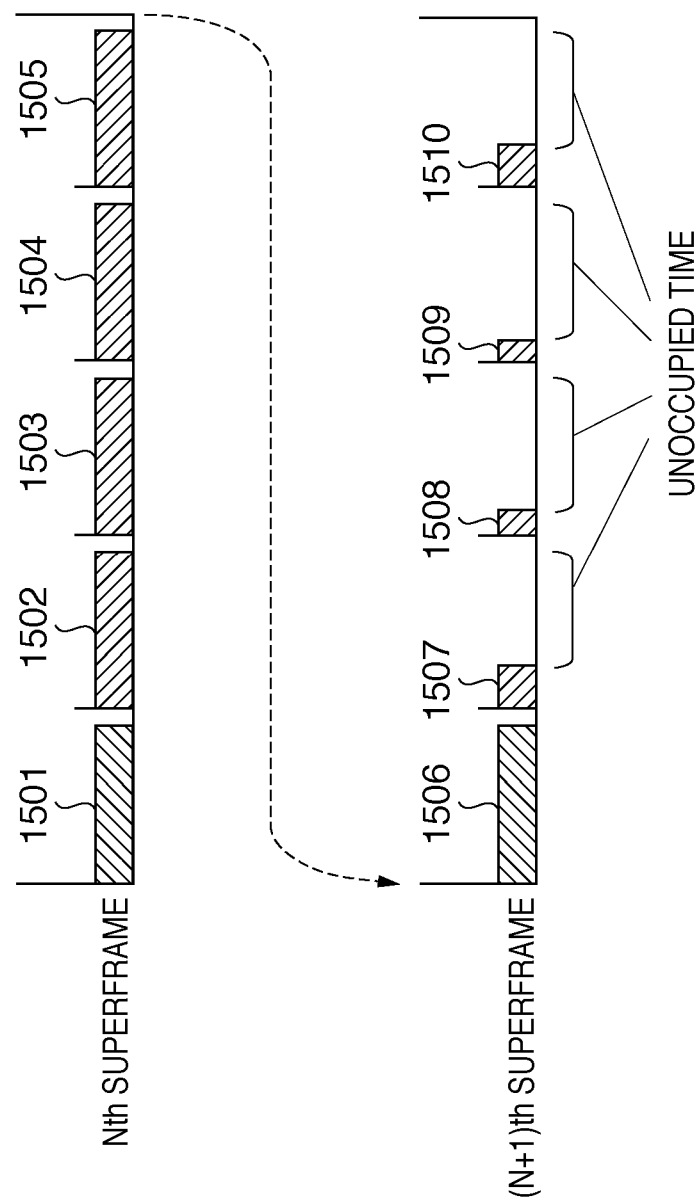
FIG. 15 is a diagram illustrating the structure of superframes in the third embodiment.
Figure 16:
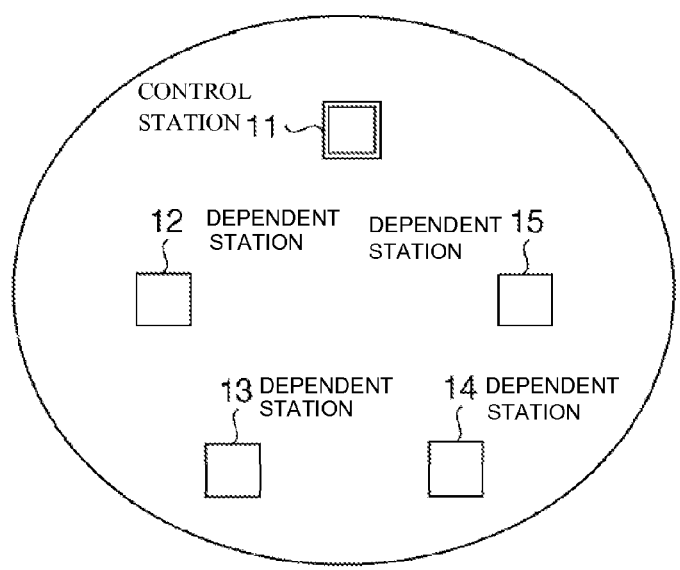
FIG. 16 is a diagram illustrating an example of the configuration of a repeater system.

FIG. 15 is a diagram illustrating the structure of superframes in the third embodiment. First, in the Nth superframe, the control station 101 broadcasts a broadcast frame 1501.

The broadcast frame 1501 has the frame format shown in FIG. 14. Upon receiving the broadcast frame 1501, the dependent station 103 investigates CHECKSUM-ISO1 to CHECKSUM-ISO4, which are checksums regarding each item of synchronous data. Thereafter, in its own time slot, the dependent station 103 transmits a relay frame 1503. The relay frame 1503 contains an ACKNOWLEDGEMENT field just as in the first embodiment.

In a case where a bit error has occurred only in ISO_DATA3 and the dependent station 103 has received ISO_DATA2, which is the synchronous data intended for this dependent station, without any bit error, the dependent station 103 sets the value ACK in the ACKNOWLEDGEMENT field of the relay frame 1503. Another dependent station that has received the ACKNOWLEDGEMENT field recognizes that there is no need to relay the broadcast frame 1501 to the dependent station 103.

Relay transmission with respect to the Nth broadcast frame 1501 is performed by the (N+1)th superframe, the dependent station 102 transmits a relay frame 1507 and the dependent station 105 transmits a relay frame 1510. Since the dependent stations 102 and 105 are already aware that it is unnecessary to make a relay transmission to the dependent station 103 due to the relay frame 1503, the relay frames 1507 and 1510 do not contain synchronous data intended for the dependent station 103.

Accordingly, the length of the relay frame 1507 transmitted from the dependent station 102 becomes shorter than that of the relay frame 407 shown in FIG. 4. Similarly, the length of the relay frame 1510 transmitted from the dependent station 105 becomes shorter than that of relay frame 410 shown in FIG. 4. This means that unoccupied time in the (N+1)th superframe is longer than that of the case shown in FIG. 4.

By thus improving the checksum and acknowledgement response system, it is possible to optimize relay transmission and a longer period of unoccupied time can be provided.

Further, the control station and dependent stations transmit asynchronous data by utilizing this unoccupied time through a method similar to that of the first and second embodiments. As a result, it is possible to further increase the amount of overall synchronous data and asynchronous data transferred in a repeater system.

In accordance with the embodiments described above, it is possible to reduce the number of unnecessary relay transmissions in a case where a receiving station has received a data frame correctly in a wireless repeater system. Accordingly, communication time that is no longer utilized in relay transmission can be used to transfer other data such as asynchronous data. This has the effect of increasing the amount of data transferred in the overall network.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-220501, filed Aug. 28, 2008, which is hereby incorporated by reference herein in its entirety.

The invention claimed is:

1. A communication system in which a control station broadcasts data intended for a plurality of dependent stations, on a per-superframe basis, each of the plurality of dependent stations comprising:
    a first receiving unit that receives data broadcast from the control station in an Nth (where N is an integer) superframe;
    a second receiving unit that receives a response that indicates a reception condition of the data on another dependent station; and
    a relaying unit that relays the data received by the first receiving unit to the other dependent station in a time slot that has been allocated to the dependent station in an (N+1)th superframe when the response received in an Nth superframe by the second receiving unit indicates that the other dependent station did not receive the data, and restricts to relay the data received by the first receiving unit to the other dependent station when the response received by the second receiving unit indicates that the other dependent station received the data.

2. The system according to claim 1, wherein
the data intended for the other dependent station is relayed when the response indicating that the data from the control station was received correctly is not received from the other dependent station.

3. The system according to claim 1, wherein
the data intended for the other dependent station is relayed when the response indicating that the data from the control station was not received correctly was received from the other dependent station.

4. The system according to claim 1, wherein
the dependent station transmits other data in a time period that has been reserved for a relay in a time slot that has been allocated to the dependent station when each of the plurality of dependent stations does not relay data intended for another dependent station.

5. The system according to claim 1,
wherein the control station comprises a detecting unit that detects a time period that is not being used, in order that each dependent station may relay data intended for another dependent station; wherein other data is transmitted in the detected time period.

6. The system according to claim 1, wherein
each of the plurality of dependent stations transmits the response and relayed data in one frame.

7. The system according to claim 1, wherein data broadcast from the control station and relayed among the plurality of dependent stations is synchronous data.

8. A dependent station, comprising:
    a first receiving unit that receives data broadcast from a control station in an Nth (where N is an integer) superframe;
    a second receiving unit that receives a response that indicates a reception condition of the data on another dependent station; and
    a relaying unit that relays the data received by the first receiving unit to the other dependent station in a time slot that has been allocated to the dependent station in an (N+1)th superframe when the response received in an Nth superframe by the second receiving unit indicates that the other dependent station did not receive the data, and restricts to relay the data received by the first receiving unit to the other dependent station when the response received by the second receiving unit indicates that the other dependent station received the data.

9. The dependent station according to claim 8, wherein the data intended for the other dependent station is relayed when the response indicating that the data from the control station was received correctly is not received from the other dependent station.

10. The station according to claim 8, wherein the data intended for the other dependent station is relayed when the response indicating that the data from the control station was not received correctly was received from the other dependent station.

11. The dependent station according to claim 8, wherein the dependent station transmits other data in a time period that has been reserved for relaying in a time slot that has been allocated to the dependent station when each of the plurality of dependent stations does not relay data intended for another dependent station.

12. The dependent station according to claim 8,
wherein the control station includes a detecting unit that detects a time period that is not being used, the time period having been reserved, in order that each dependent station may relay data intended for another dependent station, and
wherein other data is transmitted in the detected time period.

13. A method of relay transmission by a dependent station, comprising:
receiving data broadcast from a control station in an Nth (where N is an integer) superfame;
receiving a response that indicates a reception condition of the data on another dependent station; and
relaying the data received from the control station to the other dependent station in a time slot that has been allocated to the dependent station in an (N+1)th superframe when the response in an Nth superframe indicates that the other dependent station did not receive the data; and
restricting to relay the data received from the control station to the other dependent station when the response indicates that the other dependent station received the data.

14. A non-transitory computer-readable recording medium storing a program for causing a computer to perform the method set forth in claim 13.

15. A first communication apparatus comprising:
a reception unit configured to receive data transmitted from a second communication apparatus, the data being transmitted in an Nth superframe which includes at least a transmission period of said first communication apparatus and a transmission period of the second communication apparatus;
a determination unit configured to determine a reception condition of data on a third communication apparatus, which has been transmitted from the second communication apparatus in the Nth superframe; and
a transmission unit configured to transmit at least data addressed to the third communication apparatus in the Nth superframe or later in an (N+1)th superframe when it is determined that the third communication apparatus did not receive the data, and restrict to transmit the data to the third communication apparatus when it is determined that the third communication apparatus received the data.

16. The apparatus according to claim 15, wherein the transmission unit transmits at least the data addressed to the third communication apparatus, which was received by the reception unit,
in of the Nth superframe or later in case that the third communication apparatus cannot receive the data transmitted from the second communication apparatus in the Nth superframe, and the transmission unit transmits other data using the period assigned for transmitting data addressed to the third communication apparatus in case that the third communication apparatus can receive the data transmitted from the second communication apparatus in the Nth superframe.

17. The apparatus according to claim 15, wherein the determination unit determines the reception condition on the third communication apparatus based on a receipt acknowledgement signal.

18. The apparatus according to claim 15, wherein the determination unit determines the reception condition on the third communication apparatus based on a signal indicating that data have not been normally received.

19. The apparatus according to claim 15, wherein when the reception unit receives the data addressed to the third communication apparatus and the third communication apparatus was not able to receive the data, the transmission unit transmits at least the data addressed to the third communication apparatus, which has been received by the reception unit, in of the Nth superframe or later.

20. The apparatus according to claim 15, wherein the determination unit determines a reception condition of data transmitted by the second communication unit, which include data addressed to the first communication apparatus and data addressed to the third communication apparatus.

21. The apparatus according to claim 15, wherein the determination unit determines reception condition of data addressed to the third communication apparatus, which was transmitted by the second communication apparatus.

22. The apparatus according to claim 15, wherein reception of data by the reception unit and transmission of data by the transmission unit are performed by wireless communication.

23. A control method of a first communication apparatus, the method comprising:
receiving data transmitted from a second communication apparatus, the data being transmitted in Nth superframe which includes at least a transmission period of said first communication apparatus and a transmission period of the second communication apparatus;
determining a reception condition of data on a third communication apparatus, which has been transmitted from the second communication apparatus in the Nth superframe; and
transmitting at least data addressed to the third communication apparatus in a cycle of the Nth superframe or later in an (N+1)th superframe when it is determined that the third communication apparatus did not receive the data, and restricting to transmit the data to the third communication apparatus when it is determined that the third communication apparatus received the data.

24. A non-transitory computer-readable recording medium storing a program which, when executed by a computer, causes the computer to perform the method set forth in claim 23.

* * * * *